(12) United States Patent
Yocca et al.

(10) Patent No.: US 11,220,596 B2
(45) Date of Patent: *Jan. 11, 2022

(54) FUNCTIONALIZED ACRYLIC PROCESS AIDS USED FOR GLOSS AND SURFACE FINISH MODIFICATION

(71) Applicant: Arkema France, Colombes (FR)

(72) Inventors: Kevin R. Yocca, Schwenksville, PA (US); David A. Mountz, Exton, PA (US); Jason M. Lyons, King of Prussia, PA (US)

(73) Assignee: Arkema France, Colombes (FR)

( * ) Notice: Subject to any disclaimer, the term of this patent is extended or adjusted under 35 U.S.C. 154(b) by 124 days.

This patent is subject to a terminal disclaimer.

(21) Appl. No.: 16/081,055

(22) PCT Filed: Mar. 23, 2017

(86) PCT No.: PCT/US2017/023707
§ 371 (c)(1),
(2) Date: Aug. 30, 2018

(87) PCT Pub. No.: WO2017/165582
PCT Pub. Date: Sep. 28, 2017

(65) Prior Publication Data
US 2019/0055389 A1  Feb. 21, 2019

Related U.S. Application Data

(60) Provisional application No. 62/313,187, filed on Mar. 25, 2016.

(51) Int. Cl.
| | | |
|---|---|---|
| *C08L 27/06* | (2006.01) | |
| *C08L 33/12* | (2006.01) | |
| *C08L 25/06* | (2006.01) | |
| *C08L 31/02* | (2006.01) | |
| *C08L 63/00* | (2006.01) | |

(52) U.S. Cl.
CPC ............ *C08L 27/06* (2013.01); *C08L 25/06* (2013.01); *C08L 31/02* (2013.01); *C08L 33/12* (2013.01); *C08L 63/00* (2013.01); *C08L 2205/025* (2013.01); *C08L 2205/03* (2013.01); *C08L 2312/00* (2013.01)

(58) Field of Classification Search
CPC ... C08L 27/06; C08L 33/068; C08L 63/00–10
See application file for complete search history.

(56) References Cited

U.S. PATENT DOCUMENTS

| | | |
|---|---|---|
| 3,301,919 A | 1/1967 | Cenci et al. |
| 7,547,739 B2 | 6/2009 | Frese et al. |
| 7,557,158 B2 | 7/2009 | Van Rheenen |
| 7,989,082 B2 | 8/2011 | Van Rheenen |
| 8,722,750 B2 | 5/2014 | Van Rheenen et al. |
| 2003/0008959 A1 | 1/2003 | Crabb et al. |
| 2007/0287782 A1 | 12/2007 | Frenkel et al. |
| 2010/0143629 A1 | 6/2010 | Delprat et al. |

FOREIGN PATENT DOCUMENTS

| | | |
|---|---|---|
| EP | 0 137 268 | 4/1985 |
| JP | S6090241 A | 5/1985 |
| KR | 20020085815 A | 11/2002 |
| KR | 20090059385 A | 6/2009 |
| KR | 101030513 | 4/2011 |

OTHER PUBLICATIONS

KR 1020090059385 A machine translation (Jun. 2009.*

* cited by examiner

*Primary Examiner* — Ana L. Woodward
(74) *Attorney, Agent, or Firm* — Lynn B. Morreale

(57) ABSTRACT

A method of reducing gloss that results in a polyvinyl chloride (PVC) component that exhibits a reduced level of surface gloss; wherein, the PVC or other thermoplastic resin component comprises: a PVC resin; one or more process aids comprising at least one base polymer with one or more of the process aids being functionalized with about 0.5 wt. % to about 35 wt. % of a reactive epoxy, hydroxyl, or carboxylic acid functional group based on the total weight of the process aids; and optionally, at least one impact modifier. The PVC or other thermoplastic resin component exhibits a gloss reduction of at least 5 points measured at an angle of 85 degrees or less when compared to a similar PVC component in which the process aids are not functionalized.

24 Claims, 2 Drawing Sheets

FUNCTIONALIZED ACRYLIC PROCESS AIDS USED FOR GLOSS AND SURFACE FINISH MODIFICATION

CROSS-REFERENCE TO RELATED APPLICATIONS

This application is a national stage application under 35 U.S.C. § 371 of PCT/US2017/023707 filed Mar. 23, 2017, which claims benefit to U.S. patent application Ser. No. 62/313,187 filed Mar. 25, 2016.

FIELD OF THE INVENTION

This disclosure relates generally to process aids used in polyvinyl chloride (PVC) formulations as well as in other thermoplastic polymers. More specifically, the present disclosure relates to process aids that are capable of reducing the specular gloss of PVC and other thermoplastic polymer components without sacrificing mechanical properties.

BACKGROUND OF THE INVENTION

The statements in this section merely provide background information related to the present invention and may not constitute prior art.

Polyvinyl chloride (PVC) resins are generally chemically inert, resistant to water and environmental corrosion, provides good electrical and thermal insulation, and can maintain performance over a large temperature range. The commercial polymerization processes and post-polymerization processing techniques (e.g., extrusion, injection molding, blow molding, etc.) used with polyvinyl chloride (PVC) or "vinyl", as it is commonly called, have matured over the past century. This manufacturing base along with the basic properties exhibited by PVC has led to a proliferation of PVC-containing products. For example, within the decade, the sale of vinyl windows (e.g., ~31 million annually) has surpassed the sale of both wood and aluminum-based windows. Vinyl products are durable, recyclable, and easily maintained. They are resistant to fungus and mildew growth and are not affected by rot, corrosion, cracking, flaking, or insect infestation. Vinyl products exhibit excellent fire resistance properties, which meet most building codes for ignitability, flammability, heat released, burning rate, flame spread, and smoke generation. Since vinyl products typically are the same color throughout, minor scratches do not require painting or repair, and the aesthetics are easily maintained by washing with soap and water. When properly installed and maintained, vinyl products provide long lasting aesthetics, reliable performance, and continued energy savings.

The dispersion of pigments into the PVC formulation can be used to provide color, while the incorporation of matting agents into the formulation can modify the surface gloss exhibited by a final PVC product. Matting agents typically fall within three areas: i) a polymer core/shell impact modifier having a core of poly(butyl acrylate) and a shell of poly(methyl acrylate), such as Paraloid™ (the Dow Chemical Company, Midland, Mich.); ii) a cross-linked poly (methyl methacrylate) particle having an average size of several microns, such as Techpolymer® MBX K-8 (Sekisui Plastics Co. Ltd., Tokyo, Japan) or Altuglas® BS 100 particles (Arkema Inc., King of Prussia, Pa.); and iii) polymers such as methyl methacrylate/styrene copolymers, such as Acematt® OP 278 (Evonik Industries, Essen, Germany). However, many matting agent technologies for PVC and other thermoplastic polymers and resins either may not provide a substantial decrease in surface gloss or they may negatively affect other mechanical properties associated with the formed PVC component.

Other thermoplastic resins can also be used in similar capacity as PVC resins using similar post-polymerization processes to yield the final articles. These resins can include acrylic polymers, styrenics, polyolefins, PVC blends, polycarbonates, polyurethanes, fluoropolymers and mixtures thereof.

U.S. Pat. No. 7,557,158 discloses thermoplastic polymer compositions that can be processed into capstocks having a reduced gloss appearance, high impact strength, and superior weatherability. The thermoplastic polymer compositions are claimed to comprise a core/shell polymer with a core derived from an alkyl acrylate monomer and the shell being a copolymer derived form an alkyl methacrylate monomer and another co-polymerizable monomer.

U.S. Pat. No. 3,301,919 discloses processing aids for polyvinyl chloride that comprise substantially linear copolymers obtained by polymerizing a mixture of 20-98.5 percent by weight methyl methacrylate, 0.5-40 percent by weight of ethyl acrylate and 1-40 percent by weight of glycidyl methacrylate, such that the oxirane ring is intact in at least 85 percent of the glycidyl methacrylate units.

Korean Patent No. 101030513 discloses a method for manufacturing a methacrylate copolymer used as a processing aid for a vinyl chloride resin. The method comprises the steps of polymerizing a monomer mixture in the presence of a water-soluble initiator and an emulsifier to prepare a polymer latex; and solidifying the polymer latex. The monomer mixture comprises 60-85 weight percent of methyl meth acrylate, 15-30 weight percent of an alkyl acrylate-based compound and 1-10 weight percent of an epoxide-based compound.

SUMMARY OF THE INVENTION

The present invention generally provides a polyvinyl chloride (PVC) and other thermoplastic polymers and resins with reduced surface gloss, as well as a method of reducing said surface gloss. The PVC or other thermoplastic polymer/resin comprises: a polymer or resin such as PVC; one or more process aids; and optionally, at least one impact modifier. A component made of the PVC or other thermoplastic polymer/resin exhibits gloss reduction of at least 5 points measured at an angle of 85 degrees or less when compared to a similar component in which the process aids are not functionalized. A component made of the PVC or other thermoplastic polymer/resin may be used in an automotive product, a building material, a household or kitchen item, a medical or office supply product, an electronic product, apparel, or packaging for personal care or other consumer products.

The process aids comprise at least one base polymer with one or more of the process aids being functionalized with about 0.5 wt. % to about 35 wt. % of a reactive epoxy, hydroxyl, or carboxylic acid functional group based on the total weight of the process aids. The process aids are present in about 0.1 to about 12 phr in PVC formulations or 0.1 to about 20 phr in other (that is non PVC) thermoplastic resin components. When desirable, the process aids may be functionalized with at least 1 wt. % of the reactive functional group based on the total weight of the process aids. The reactive epoxy, hydroxyl, or carboxylic acid functional groups in the process aids may be derived from hydroxyl-substituted alkyl esters of (meth) acrylic acid; vinyl esters of linear or branched carboxylic acids; unsaturated $C_3$-$C_6$ monocarboxylic acids and unsaturated $C_4$-$C_6$ dicarboxylic acids; epoxy group-containing monomers; or a mixture thereof.

According to one aspect of the present disclosure, the PVC or other thermoplastic resin component may exhibit a gloss reduction of at least 10 points when measured at an angle of 60 degrees or less. In addition, the PVC or other thermoplastic resin component that contains the functionalized process aids and the similar PVC component that contains the non-functionalized process aids may exhibit a comparable impact property. This impact property may be without limitation Izod impact or drop dart impact.

According to another aspect of the present disclosure, the process aids may exhibit an average molecular weight or weight average molar mass that is ~50,000 g/mol or higher. The base polymer in the process aids may comprise an acrylic polymer or copolymer. This acrylic polymer or copolymer can be derived from vinyl- or (meth)acrylic-containing monomers; styrene or styrene derivatives; olefins; dienes; or mixtures thereof. The process aids facilitate cross-linking within the PVC or other thermoplastic resin component. The process aids may also comprise between 0 to about 1 wt. % of a chain transfer or cross-linking agent.

The method of reducing the surface gloss of the polyvinyl chloride (PVC) or other thermoplastic resin component comprises: providing a PVC or other base thermoplastic resin; forming at least one base polymer as a process aid; functionalizing the at least one base polymer to form a functionalized process aid; optionally, providing at least one impact modifier; producing a formulation from the base resin, the functionalized process aid, and the optional impact modifier; and forming the PVC or other thermoplastic resin component from the formulation. The base polymer is functionalized with about 0.5 wt. % to about 35 wt. % of a reactive epoxy, hydroxyl, or carboxylic acid functional group based on the total weight of the process aid. The resulting PVC component exhibits a gloss reduction of at least 5 points measured at an angle of 85 degrees or less when compared to a similar PVC component in which the process aids are not functionalized. Alternatively, the PVC or other thermoplastic resin component exhibits a gloss reduction of at least 10 points when measured at an angle of 60 degrees or less. The PVC or other thermoplastic resin component that contains the functionalized process aids and the similar PVC component containing the non-functionalized process aids may also exhibit a comparable impact property. This impact property may be without limitation measured as Izod impact or drop dart impact.

The gloss reducing method may further include the process aids being present in about 0.1 to about 12 phr in PVC formulations or 0.1 to about 20 phr in other thermoplastic resin formulations. When desirable, the process aids may be functionalized with at least 1 wt. % of the reactive functional group based on the total weight of the process aids. The reactive epoxy, hydroxyl, or carboxylic acid functional group of the process aids may be derived from hydroxyl-substituted alkyl esters of (meth)acrylic acid; vinyl esters of linear or branched carboxylic acids; unsaturated $C_3$-$C_6$ monocarboxylic acids and unsaturated $C_4$-$C_6$ dicarboxylic acids; epoxy group-containing monomers; or a mixture thereof. The base polymer of the process aids may be comprised of an acrylic polymer or copolymer. This acrylic polymer or copolymer can be derived from vinyl- or (meth)acrylic-containing monomers; styrene or styrene derivatives; olefins; dienes; or mixtures thereof. The functionalized process aids may have a molecular weight ($M_w$) that is ~50,000 g/mol or higher.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
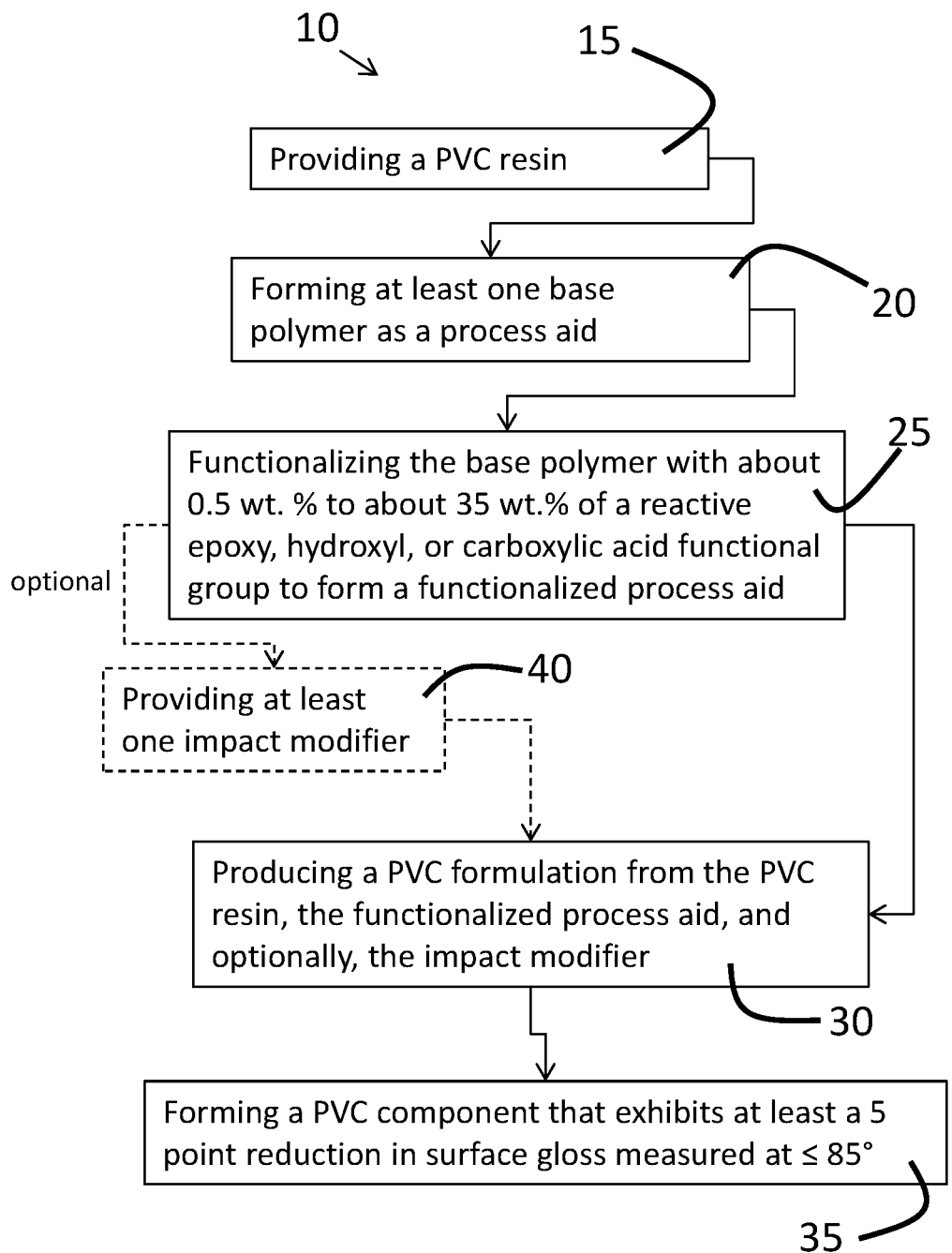
FIG. 1 is a schematic representation of a method of forming a component from PVC or other thermoplastic polymer/resin according to the teachings of the present disclosure.

The following description is merely exemplary in nature and is in no way intended to limit the present disclosure or its application or uses. For example, the polyvinyl chloride (PVC) formulations made and used according to the teachings contained herein is described throughout the present disclosure in conjunction with "PVC" or "vinyl" windows and doors in order to more fully illustrate the composition and the use thereof. The incorporation and use of such a PVC formulation in other applications or products are contemplated to be within the scope of the present disclosure. Formulations made using other thermoplastic polymers/resins in other applications or products are also contemplated to be within the scope of the present disclosure. Such applications may include but not be limited to automotive products, building materials, household or kitchen items, medical or office supply products, apparel, or packaging for personal care or other consumer products. It should be understood that throughout the description, corresponding reference numerals indicate like or corresponding parts and features.

The present disclosure generally provides a polyvinyl chloride (PVC) or other thermoplastic resin component that exhibits reduced surface gloss without sacrificing mechanical properties. More specifically, the PVC or other thermoplastic resin component comprises, consists essentially of, or consists of a polyvinyl chloride (PVC) or other thermoplastic resin; one or more process aids, wherein at least one of the process aids is functionalized with about 0.5 wt. % to about 35 wt. % of a reactive epoxy, hydroxyl, or carboxylic acid functional group based on the total weight of the process aids; and optionally, at least one impact modifier. The PVC or other thermoplastic resin component formed therefrom exhibits a gloss reduction of at least 5 points measured at an angle of 85 degrees or less when compared to a similar PVC component in which the process aids (PA) are not functionalized. The functionalized process aid (f-PA), used alone or when paired with an impact modifier, surprisingly decreases the surface gloss and maintains the mechanical properties exhibited by the PVC or other thermoplastic resin component, which are beneficial for many applications where aesthetics are important. The mechanical properties that remain substantially unaffected or become enhanced upon the functionalization of the process aid with a reactive functional group include, without limitation, impact properties and density, as well as the parameters associated with the processability (e.g., extrusion) of the PVC or other thermoplastic resin formulation.

According to one aspect of the present disclosure, the reduction in surface gloss exhibited by a PVC component comprising a functionalized process aid (f-PA) as compared to a similar PVC component with conventional process aids (PA) may alternatively be characterized as at least 10 points measured at an angle of 60 degrees or less; alternatively, at least 15 points measured at an angle of 20 degrees. Alternatively, the change (Δ) in surface gloss between a PVC component with a f-PA as compared to a similar PVC component with a conventional PA is greater than about 5 points measured at any angle; alternatively greater than about 10 points measured at any angle; alternatively, greater than 20 points measured at 85°; alternatively, greater than 25 points measured at 60° or less; alternatively, greater than 30 points measured at 60° or less.

According to another aspect of the present disclosure, functionalized process aids that are synthesized for polyvinyl chloride processing and modified with functional groups as described above and further defined herein achieve differentiating effects in the polyvinyl chloride matrix as compared to conventional acrylic process aids. The functionalized process aids comprise acrylic polymers or copolymers synthesized with reactive epoxy, hydroxyl, or carboxylic acid functional groups, which are capable of reacting during the process that is used to form the PVC or other thermoplastic resin component. An example of a method capable of forming the PVC or other thermoplastic resin component includes, without limitation, an extrusion process. During the extrusion process, the reactive functional groups facilitate the occurrence of crosslinking with or without the presence of an optional chain extender or crosslinking agent. When desirable, the crosslinking during extrusion may occur between particles that are formed by the process aids (e.g., crosslinking between process aid to process and/or crosslinking between process aid and PVC). Conventional process aids used in polyvinyl chloride (PVC) formulations are typically comprised of acrylate and methacrylate monomers, which are not reactive during such processing. The functionalized process aids of the present disclosure may be made according to any method known in the art, including, but not limited to, emulsion polymerization.

The processing aids may be "acrylic" polymers or copolymers with a variety of different compositions and molecular weights. They may be higher in molecular weight than the PVC resin or other thermoplastic resin. In PVC resin specifically, because they are very compatible with the PVC resin, they assist with inter-particle mixing of the PVC particles at the beginning stages of fusion. The process aids of the present disclosure may have a weight average molecular weight (also called molar mass ($M_w$)) that is greater than about 50,000 g/mol; alternatively, the weight average molecular weight of the process aids is greater than about 100,000 g/mol; alternatively, the molecular weight ($M_w$) of the process aids is about 250,000 g/mol or greater; alternatively, the ($M_w$) soluble fraction of the process aids is between about 50,000 g/mol to about 15 million g/mol, alternatively between about 750,000 g/mol to about 12 million g/mol. The molecular weight may be measured by any known method including but not limited to gel permeation chromatography (GPC), the procedure of which is further described in Example 2. The upper end of the molecular weight measurement may be affected by the occurrence of crosslinking between polymeric process aids.

In one embodiment, the process aids of the invention surprisingly exhibit insolubility in organic solvents. The soluble and insoluble fractions of the process aids may be determined through the use of an extraction technique (see Example 2) with a solvent, such as acetone, tetrahydrofuran (THF), or methyl ethyl ketone (MEK). The insoluble fraction of the process aids ranges from 1% to about 90%, alternatively, the insoluble fraction ranges from about 2% to about 70%; alternatively, the insoluble fraction ranges from about 4% to about 55%, preferably from about 10 to 50%, more preferably about 20 to 45%, even more preferably about 25 to 40%.

The process aids exhibit a glass transition temperature ($T_g$) that is greater than or equal to 0° C. and up to about 150° C.; alternatively, the $T_g$ of the process aids is within the range of about 60° C. to about 85° C. The $T_g$ of of the process aids can be measured either as powders or pressed bars formed from said powders using any known method, including but not limited to analysis by differential scanning calorimetry (DSC) as further described in Example 3.

The process aids comprise a base polymer or copolymer derived from ethylenically unsaturated monomers, including without limitation, vinyl- and (meth)acrylic-containing monomers, such as linear or branched alkyl esters of acrylic or methacrylic acid; styrene and styrene derivatives; olefins, such as ethylene; dienes, such as butadiene; and mixtures thereof, with linear or branched alkyl esters of acrylic or methacrylic acid being preferred. Several specific examples of vinyl- and (meth)acrylic-containing monomers, include, but are not limited to, methyl(meth)acrylate, ethyl(meth)acrylate, n-butyl(meth)acrylate (BMA), 2-ethylhexyl(meth)acrylate, glycidyl(meth)acrylate, and mixtures thereof, with methyl(meth)acrylate, ethyl(meth)acrylate, and glycidyl(meth)acrylate being preferred. Alternatively, the base polymer or copolymer may be poly(methyl methacrylate), poly(butyl acrylate), poly(ethyl acrylate), poly(methyl methacrylate-styrene) copolymer, or a mixture thereof. Alternatively, the base polymer comprises preferred poly(methyl methacrylate) for compatibility with the PVC matrix. When desirable, other acrylates, such as poly(butyl acrylate) or poly(ethyl acrylate), can be added at a level of 10-30 wt. % to control the glass transition temperature ($T_g$) and fusion properties of the functionalized process aid.

At least one of the process aids used in the PVC or other thermoplastic resin formulation to form a PVC or other thermoplastic resin component is functionalized with about 0.5 wt. % to about 35 wt. % of a reactive epoxy, hydroxyl, or carboxylic acid functional group based on the total weight of the process aids. Alternatively, the loading of the reactive group functionalization is between about 1 wt. % and about 25 wt. %; alternatively, the one or more process aids includes at least between about 5 wt. % and about 20 wt. % of the reactive functional groups based on the weight of the total weight of the process aids. Not all of the process aids utilized in the formulation needs to be functionalized. In other words a conventional process aid (PA) and a functionalized process aid (f-PA) may be utilized in combination. The ratio of PA to f-PA may range from 0:100 to about 75:25; alternatively from about 0:100 to about 50:50; alternatively, from about 0:100 to about 25:75.

The process aids may be used in powder or particle form. This powder or particles may be solid particles that comprise a base polymer that is substantially functionalized with the reactive groups or they may be pseudo core-shell particles. The functionalized process aids (f-PA) may be prepared in a multi-step polymerization process such that the functionalized process aids resemble pseudo core-shell particles that comprise a core made of non-functionalized base polymer with at least part of said core being encapsulated with a shell that includes reactive epoxy, hydroxyl, or carboxylic acid functional groups.

The reactive epoxy, hydroxyl, or carboxylic acid groups may be derived from the addition of epoxy, hydroxyl, or carboxylic acid containing monomers to the base polymer. Examples of such monomers include, but are not limited to, hydroxyl-substituted alkyl esters of (meth)acrylic acid, such as 2-hyroxyethyl(meth)acrylate; vinyl esters of linear or branched carboxylic acids, such as vinyl valerate, unsaturated carboxylic acids, including unsaturated $C_3$-$C_6$ monocarboxylic acids, such as acrylic acid (AA), and unsaturated $C_4$-$C_6$ dicarboxylic acids, such as maleic acid and itaconic acid; and epoxy group-containing monomers, such as glycidyl acrylate or glycidyl methacrylate (GMA). Unsaturated $C_3$-$C_6$ monocarboxylic acids, such as acrylic acid (AA), and unsaturated $C_4$-$C_6$ dicarboxylic acids, such as maleic acid and itaconic acid; and epoxy group-containing monomers, such as glycidyl acrylate or glycidyl methacrylate (GMA) are preferred, with acrylic acid, glycidyl acrylate, and glycidyl methacrylate (GMA) being more preferred. Alternatively, the functional groups may be incorporated into the base polymer of the process aids through the addition of acrylic acid (AA), glycidyl methacrylate (GMA), which are most preferred, or a mixture thereof.

The amount of process aids present in the PVC formulation may range from about 0.1 phr to about 12 phr in PVC formulations or 0.1 to about 20 phr in other thermoplastic resin components; alternatively, from about 0.1 phr to about 7 phr in PVC formulation or 0.1 to about 10 phr in other thermoplastic resin components; alternatively, greater than or equal to 1 phr. In the context of the present disclosure, the term "phr" means parts per hundred parts of PVC or other thermoplastic base resin. The amount of the process aids present in the PVC or other thermoplastic resin formulation may also be expressed as a weight percentage based on the total weight of the PVC or other thermoplastic resin formulation. The use level of the process aids in the PVC formulation may vary depending on the type of PVC formulation selected and the specification set forth for the application in which the PVC or other thermoplastic resin component will be utilized. In other words, the amount of the process aid in the formulation may be predetermined based on the use level necessary to reduce surface gloss to a level that matches the color requirements for a given application (i.e., siding, window profile, pipe, or foamed sheet, among others).

Without being bound to any theory, the processing aids may promote fusion of the PVC resin by altering the melt rheology of the PVC formulation during extrusion. The processing aids also may assist with enhancing mixing of the components as melting of the PVC resin occurs, improving the strength of the melted polymer blend, controlling the volume increase or swelling that occurs immediately after the melted polymer blend leaves the die opening (e.g., die swell), and reducing the occurrence of plate out and crystallinity, as well as improving long-term impact strength and weatherability. In general, a processing aid with a higher molecular weight tends to lead to a higher level of die swell. A higher level of die swell may be beneficial when making a foamed PVC component.

The functionalized process aid (f-PA) also is capable of facilitating cross-linking during the process of forming a PVC component from the PVC formulation. Such cross-linking can occur with or without the presence of a chain transfer agent or across-linking agent. The optional chain transfer agent or cross-linking agent may be incorporated into the process aid when desirable in an amount ranging from above 0 wt. % to about 1 wt. % based on the overall weight of the process aid. Several examples of such chain transfer agents or cross-linking agents include, without limitation, mercaptans, polymercaptans, alcohols, and halogen-containing compounds, with mercaptans and polymercaptans being preferred.

In other thermoplastic resins the purpose of the process aid is to reduce gloss.

The PVC resin may be produced at a number of different molecular weights using any method known in the art, including, but not limited to solution, suspension, or emulsion polymerization. The PVC resin may include, but not be limited to, rigid PVC resins, flexible PVC resins, PVC plastisols, as well as mixtures or combinations formed with one or more other thermoplastic and/or thermoset resins. The PVC resin may be characterized by its molecular weight, which is commonly reported as inherent viscosity (IV) or K-value. In general, the higher the IV or K-value of the PVC resin, the greater the impact strength of the PVC or other thermoplastic resin component made therefrom. However, PVC resins having a high molecular weight are also more difficult to achieve fusion and polymer flow without the use of excessive heat or shear. The molecular weight of the PVC resin used in the formulation from which a PVC component is made can be predetermined based on the mechanical properties and economic factors desired for the final product. Typically, resins within the K-value range of about 56 to about 72; alternatively, about 63 to about 67; alternatively, about 65 are used for forming PVC components having a rigid profile with lower molecular weights being used for foam applications. The molecular weight of the PVC resin is generally less than the molecular weight of the process aids used therewith. The amount of the PVC resin used in the formulation to form the PVC or other thermoplastic resin component may range from about 30 wt. % to about 85 wt. % of the entire PVC formulation; alternatively between about 50 wt. % to about 80 wt. %.

Other thermoplastics useful in the present invention as, for example, a cap layer over a substrate, include but not are limited to acrylic polymers, styrenic polymers, polyolefins, polyvinyl chloride (PVC), polycarbonate (PC), polyurethane (PU), polyvinylidine fluoride polymers (PVDF), polylactic acid (PLA), and the like, and mixtures thereof. Such other thermoplastics as described herein may be combined with PVC, or used in any combination thereof with or without PVC, and further including the process aids of the invention to form a component with reduced surface gloss.

Styrenic polymers, as used herein, include but are not limited to, polystyrene, high-impact polystyrene (HIPS), acrylonitrile-butadiene-styrene (ABS) copolymers, acrylonitrile-styrene-acrylate (ASA) copolymers, styrene acrylonitrile (SAN) copolymers, methacrylate-acrylonitrile-butadiene-styrene (MABS) copolymers, styrene-butadiene copolymers (SB), styrene-butadiene-styrene block (SBS) copolymers and their partially or fully hydrogenated derivatives, styrene-isoproene copolymers styrene-isoprene-styrene (SIS) block copolymers and their partially or fully hydrogenenated derivatives, styrene-(meth)acrylate copolymers such as styrene-methyl methacrylate copolymers (S/MMA), and mixtures thereof. A preferred styrenic polymer is ASA. Styrenic copolymers of the invention have a styrene monomer content of at least 10 percent by weight, preferably at least 25 percent by weight.

The styrenic polymers can also be blended with other polymers to form compatible blends. Examples include ASA blended with PVC, and SAN blended with PMMA.

Acrylic polymers, as used herein, include but are not limited to, homopolymers, copolymers and terpolymers comprising alkyl (meth)acrylates.

The alkyl methacrylate monomer is preferably methyl methacrylate, which may make up from 60 to 100 of the monomer mixture. 0 to 40 percent of other acrylate, methacrylate, and/or other vinyl monomers may also be present in the monomer mixture. Other methacrylate, acrylate, and other vinyl monomers useful in the monomer mixture include, but are not limited to methyl acrylate, ethyl acrylate and ethyl methacrylate, butyl acrylate and butyl methacrylate, iso-octyl methacrylate and acrylate, lauryl acrylate and lauryl methacrylate, stearyl acrylate and stearyl methacrylate, isobornyl acrylate and methacrylate, methoxy ethyl acrylate and methacrylate, 2-ethoxy ethyl acrylate and methacrylate, dimethylamino ethyl acrylate and methacrylate monomers, styrene and its derivatives. Alkyl (meth) acrylic acids such as (meth)acrylic acid and acrylic acid can be useful for the monomer mixture. Small levels of multifunctional monomers as crosslinking agents may also be used. A preferred acrylic polymer is a copolymer of methyl methacrylate and 2-16 percent of one or more $C_{1-4}$ acrylates.

The thermoplastic polymers of the invention can be manufactured by any means known in the art, including emulsion polymerization, solution polymerization, and suspension polymerization. In one embodiment, the thermoplastic matrix has a weight average molecular weight of between 50,000 and 500,000 g/mol, and preferably from 75,000 and 150,000 g/mol, as measured by gel permeation chromatography (GPC). The molecular weight distribution of the thermoplastic matrix may be monomodal, or multimodal with a polydispersity index greater than 1.5.

Especially preferred thermoplastics for the matrix polymer are styrenic polymers (including SAN, ABS, MABS, ASA, HIPS), acrylic, and PVDF polymers.

When desirable, the PVC formulation used to form the PVC or other thermoplastic resin component may optionally include at least one impact modifier. Impact modifiers enhance the toughness and the resistance of the final product towards cracking or shattering during any subsequent manufacturing operations that are performed on the PVC or other thermoplastic resin component, such as cutting or punching holes in the profile of the component. Impact modifies typically function by absorbing energy and/or dissipating the energy of a propagating crack. The impact modifiers may include any compatible polymeric particles, including block copolymers and "core-shell particulate" polymers having a soft rubbery core (Tg<0 degrees C.) or hard core (Tg>0 degrees) with limited compatibility with the PVC resin and a grafted, compatible, outer polymeric shell. The polymeric particles or compatible outer polymeric shell may comprise methacrylate/butadiene/styrene (MBS), acrylic polymers (e.g., known as acrylic impact modifiers [AIM]), or acrylate/butadiene/methacrylate, and acrylonitrile/butadiene/styrene (ABS); semi-compatible polymers, such as polymers of chlorinated polyethylene (CPE) and ethylene-vinyl acetate (EVA); and other polymers, such as terpolymers of ethylene/vinyl acetate/carbon monoxide, ethylene/propylene/carbon monoxide, polymers of olefins with acrylates, various copolymers of butadiene with acrylonitrile, methacrylates or other rubbers, and even polysiloxane enhanced materials. Preferred shells comprise polymethylmethacrylate (PMMA).

The PVC or other thermoplastic resin formulation may also optionally comprise one or more inorganic fillers or particles, pigments, lubricants, stabilizers, or other desired additives. For example, ultrafine CaCO3 particles may be used as a filler to enhance low temperature impact resistance and increase UV stability in rigid PVC products. Synthetic amorphous silica particles may be incorporated into a PVC formulation to also enhance impact resistance and to provide improved flow properties. Other solid fillers, including, but not limited to, kaolin clay, talc, mica, wollastonite, can calcium metasilicate, may also be incorporated into the formulation simply to reduce the cost of the formulation without substantially affecting the properties exhibited by the PVC or other thermoplastic resin component.

Various pigments may be included to provide color to the PVC or other thermoplastic resin component. These pigments generally exhibit stability at elevated temperatures and to the presence of hydrogen chloride. These pigments may include without limitation various organic pigments or ceramic pigments, such as titanium dioxide and other metal oxides, with or without a silica or alumina surface treatment.

Various lubricants may be included in a PVC formulation in relatively small amounts in order to reduce the resistance to flow of the polymer chains and other ingredients that are present. These lubricants may act as an external lubricant or metal release (slip) agent that enhances the flow of the "hot" material through the processing equipment or as an internal lubricant that reduces the melt viscosity of the material being processed. Lubricants are the main additional component that may be added to the formulation that can help facilitate or drive the fusion of the PVC resin. Several examples of lubricants include without limitation, paraffin waxes and long chain carboxylic acids or their esters, amides, and salts. The amount of lubricant utilized is typically below the level that will cause the occurrence of "plate out". Plate out occurs when the lubricants present in the formulation are squeezed out of the hot bulk material as the extrudate is leaving the die or going through a vacuum calibrator, thereby either causing a plug or deposit of material to occur.

Various stabilizers may be included in a PVC formulation or other thermoplastic formulation to enhance resistance to heat or UV light, to name a few. The heat stabilizers may include, but not be limited to, lead-based or organotin compounds, mixed metal stabilizers, or organic stabilizers, such as epoxides. The UV stabilizers may include, without limitation, hindered amines or phenols.

According to another aspect of the present disclosure, a method (10) of reducing the specular gloss of a polyvinyl chloride (PVC) or other thermoplastic resin component is provided. Referring to FIG. 1, the method (10), generally comprises providing (15) a PVC or other thermoplastic base resin, forming (20) at least one base polymer as a process aid; functionalizing (25) the base polymer with a functional reactive group to form a functionalized process aid; producing (30) a PVC or other thermoplastic resin formulation from the base resin and functionalized process aid; and forming (35) a PVC or other thermoplastic resin component from PVC or other thermoplastic resin formulation. More specific information regarding the PVC formulation and its composition was previously discussed above and is further defined herein. The base polymer is functionalized with between about 0.5 wt. % and 35 wt. % of reactive epoxy, hydroxyl, or carboxylic acid functional groups. Optionally, at least one impact modifier may also be provided (40) and incorporated into the PVC or other thermoplastic resin formulation (30). The resulting PVC or other thermoplastic resin component exhibits at least a 5 point reduction in surface gloss measured at an angle of 85° or less.

Other Embodiments of the Invention

1. A polyvinyl chloride (PVC) component with reduced surface gloss comprising:
a PVC resin; one or more process aids comprising at least one base polymer with one or more of the process aids being functionalized with about 0.5 wt. % to about 35 wt. % of a reactive epoxy, hydroxyl, or carboxylic acid functional group based on the total weight of the process aids; and optionally, at least one impact modifier; wherein the PVC component exhibits a gloss reduction of at least 5 points measured at an angle of 85 degrees or less when compared to a similar PVC component in which the process aids are not functionalized.

2. The PVC component according to Claim 1, wherein the process aids are present in about 0.1 to about 12 phr.

3. The PVC component according to any of Claim 1 or 2, wherein the one or more process aids is functionalized with at least 5 wt. % of the reactive functional group based on the total weight of the process aids and the PVC component exhibits a gloss reduction of at least 10 points when measured at an angle of 60 degrees or less.

4. The PVC component according to any of Claims 1-3, wherein the PVC component containing the functionalized process aids and the similar PVC component containing the non-functionalized process aids exhibit a comparable impact property; the impact property being measured as Izod impact or drop dart impact.

5. The PVC component according to any of Claims 1-4, wherein the reactive epoxy, hydroxyl, or carboxylic acid functional group is derived from hydroxyl-substituted alkyl esters of (meth)acrylic acid; vinyl esters of linear or branched carboxylic acids; unsaturated $C_3$-$C_6$ monocarboxylic acids and unsaturated $C_4$-$C_6$ dicarboxylic acids; epoxy group-containing monomers; or a mixture thereof.

6. The PVC component according to any of Claims 1-5, wherein the base polymer of the one or more process aids comprises an acrylic polymer or copolymer and the molecular weight ($M_w$) of the process aids is about 50,000 g/mol or higher.

7. The PVC component according to any of Claims 1-6, wherein the acrylic polymer or copolymer is derived from vinyl- or (meth)acrylic-containing monomers; styrene or styrene derivatives; olefins; dienes; or mixtures thereof.

8. The PVC component according to any of Claims 1-7, wherein the one or more functionalized process aids facilitate cross-linking with in the PVC component, the functionalized process aid further comprising between 0 to about 1 wt. % of a chain transfer or cross-linking agent.

9. The use of the PVC component of any of Claims 1-8 in an automotive product, a building material, a household or kitchen item, a medical or office supply product, apparel, or packaging for personal care or other consumer products.

10. A method of reducing surface gloss of a polyvinyl chloride (PVC) component, the method comprising:
providing a PVC resin; forming at least one base polymer as a process aid;
functionalizing the at least one base polymer to form a functionalized process aid; the base polymer being functionalized with about 0.5 wt. % to about 35 wt. % of a reactive epoxy, hydroxyl, or carboxylic acid functional group based on the total weight of the process aid; and optionally, providing at least one impact modifier; producing a PVC formulation from the PVC resin, the functionalized process aid, and the optional impact modifier; and forming the PVC component from the PVC formulation; wherein the PVC component exhibits a gloss reduction of at least 5 points measured at an angle of 85 degrees or less when compared to a similar PVC component in which the process aids are not functionalized.

11. The method according to Claim 11, wherein the process aids are present in about 0.1 to about 12 phr.

12. The method according to any of Claim 10 or 11, wherein the one or more process aids is functionalized with at least 5 wt. % of the reactive functional group based on the total weight of the process aids and the PVC component exhibits a gloss reduction of at least 10 points when measured at an angle of 60 degrees or less.

13. The method according to any of Claims 10-12, wherein the PVC component containing the functionalized process aids and the similar PVC component containing the non-functionalized process aids exhibit a comparable impact property; the impact property being measured as Izod impact or drop dart impact.

14. The method according to any of Claims 10-13, wherein the reactive epoxy, hydroxyl, or carboxylic acid functional group is derived from hydroxyl-substituted alkyl esters of (meth)acrylic acid; vinyl esters of linear or branched carboxylic acids; unsaturated $C_3$-$C_6$ monocarboxylic acids and unsaturated $C_4$-$C_6$ dicarboxylic acids; epoxy group-containing monomers; or a mixture thereof and the base polymer of the one or more process aids comprises an acrylic polymer or copolymer, the acrylic polymer or copolymer being derived from vinyl- and (meth)acrylic-containing monomers; styrene and styrene derivatives; olefins; dienes; or a mixture thereof.

15. The method according to any of Claims 10-14, wherein the one or more functionalized process aids facilitate cross-linking with in the PVC component, the one or more functionalized process aids have a molecular weight ($M_w$) that is about 50,000 g/mol or higher; the functionalized process aid further comprising between 0 to about 1 wt. % of a chain transfer or cross-linking agent.

Example 1—General Experimental Conditions & Test Protocols

Both functionalized process aids and conventional process aids were evaluated in PVC formulations to observe and compare mechanical properties, including processability, and gloss level. Polymer processing was done using a Brabender rheometer, which takes a blended PVC formulation (powder), including either control acrylic process aids or those functionalized with reactive species, and measures fusion torque, fusion time, fusion temperature and equilibrium torque. The methodology for measuring the fusion of PVC compounds using a torque rheometer is a standard practice performed according to ASTM D2538-02 (2010, ASTM International, West Conshohocken, Pa.).

Pellets made from the PVC formulations are then used in injection molding equipment to prepare injection mold test bars and plaques or sheets. After the bars and plaques were made, they were tested for impact strength and gloss with a gloss meter to record the surface's ability of each sample to reflect light. Izod impact is defined as the kinetic energy needed to initiate fracture and to continue such fracture until the specimen is broken. Izod test specimens are notched and measured according to the methodology defined in ASTM D256-10e1 (ASTM International, West Conshohocken, Pa.). The impact strength or toughness of a plastic may also be determined using a falling dart (i.e., Gardner Impact) methodology as defined according to ASTM D4226 and ASTM D5420 (ASTM International, West Conshohocken, Pa.).

Gloss is associated with the capacity of a surface to reflect more light in directions that are close to the specular. The specular gloss exhibited by the bars and plaques was measured at various angles according to the standard test methodology described in ASTM D523 (2014, ASTM, International, West Conshohocken, Pa.). The measured gloss ratings were obtained by comparing the specular reflectance of the test bars or plaques to that of a black glass standard.

The amount of each process aid that forms a soluble fraction or remains as an insoluble fraction can be determined using extraction performed with a solvent, such as acetone, THF, or MEK. A predetermined total of powder is added to a flask along with about 35 grams of a solvent. The powder/solvent mixture is stirred or shaken for 22 hours upon which time another ~30 grams of solvent is added to the flask and then stirred or shaken for an additional 1.5 hours. Then about 30 grams of the mixture solution is placed into a centrifuge tube and subjected to a centrifugal force at 16,500 rpm for 3-5 hours at a temperature of 5° C. The top portion of the separated mixture solution is added to another tube and then centrifuged a second time under similar conditions. The clear supernatant present in the centrifuge tube is collected with 10 mL of this supernatant being placed into an aluminum pan using a serological pipette. The supernatant in the aluminum pan is dried upon exposure to heat and the percentage of the insoluble fraction can determined according to Equation 1, where $W_f$ is the final weight of the aluminum pan, $W_i$ is the initial weight of the aluminum pan, $W_{powder}$ is the weight of the predetermined amount of powder placed in the flask, $V_{solvent}$ is the total volume of solvent placed in the flask, and $V_{supernatant}$ is the volume of the supernatant pipetted into the aluminum pan.

$$\% \text{ Insoluble Fraction} = \left[1 - \frac{(W_f - W_i)}{W_{power}} \times \frac{V_{solvent}}{V_{supernatant}}\right] \times 100 \quad \text{(Eq. 1)}$$

Example 2—Measurement of Molecular Weight of Process Aids

The molecular weight associated with the process aids may be determined using gel permeation chromatography (GPC) by various known methods and procedures. One such method utilizes a differential refractometer equipped with two PL gel mixed A columns and a guard column. An injection volume of 150 microliters (μL) of the soluble portion of the process aids as a THF solution with a concentration of 1.5 mg/mL is injected into the column at a temperature of 35° C. The elution of the process aids through the column is performed using a flow rate of 1.0 mL/min of the THF solvent (HPLC grade). Each sample of the process aids may be tested in either a filtered or unfiltered state. The chromatograms for each tested sample are obtained and analyzed with the molar mass values being calculated relative to a poly(methyl methacrylate), PMMA, calibration curve. Further information regarding GPC methodology is found in ASTM D4001-13 (ASTM International, West Conshohocken, Pa.).

The molar mass averages of the filtered and unfiltered samples may slightly differ from one another. In other words, the filtering of a sample thru a 1.0 μm PTFE film may affect the measured molecular weight distribution. The filtering of a sample can remove the extremely high molar mass species thus decreasing the high end of the molar mass distribution. The filtering of a sample can also result in the degradation of the high molar mass species thus increasing the amount of lower molar mass species resulting in higher values for the number average and/or weight average molar mass averages. The molar mass averages are weighted averages based on the number of molecules at each slice thus increasing or decreasing the amount of molecules of a given molar mass can affect the molar mass averages and distribution.

The molecular weight of the soluble portion of a total of thirteen (13) different process aid samples prepared according to the teachings of the present disclosure was measured. A total of three injections for each sample were averaged to obtain the average molecular weight ($M_w$). The molecular weight of each different process aid sample was obtained unfiltered, as well as filtered. The average molecular weight ($M_w$) for the tested samples ranged from 50,000 g/mol to about 15 million g/mol in both the unfiltered and filtered state. The polydispersity, which is defined as being the ratio of weight average to number average molecular weight ($M_w/M_n$), for each tested sample was measured to be between about 10 to about 60. For example, one specific process aid sample exhibited a weight average molecular weight ($M_w$) of 2,690,000 g/mol with a polydispersity of 54.2 in an unfiltered state and a $M_w$ of 2,110,000 g/mol with a polydispersity of 15.5 in a filtered state.

Example 3—Measurement of Glass Transition Temperature for Process Aids

Differential Scanning calorimetry (DSC) is utilized to determine the glass transition temperature ($T_g$) of the process aids prepared according to the teachings of the present disclosure. Each DSC measurement is obtained over the temperature range of −75° C. to 160° C. using a heating rate of 20° C./minute and a cooling rate of 10° C./minute. The $T_g$ is determined as an average of at least two measurements obtained for each sample formulation. Further description of DSC methodology is found in ASTM E1356-08(2014) (ASTM International, West Conshohocken, Pa.).

The glass transition temperature ($T_g$) of the process aids can be determined either as a powder or as a bar formed from powder. The powder may be pressed into a bar upon being subjected to an elevated temperature (e.g., 215° C.) under high pressure (e.g., 25 tons). A total of 10 different process aid samples were analyzed with the average $T_g$ for each sample being within the range of 0° C. to about 150° C. No significant difference in the glass transition temperature measured for the bars and the powders was observed. For example, one specific process aid sample exhibited a glass transition temperature of 85.0° C. in bar form and 83.4° C. in powder form.

Example 4—PVC Formulations and Components Prepared and Tested Using Process Aids Functionalized with Glycidyl Methacrylate (GMA)

A master batch of a 29,014.52 grams (116.3 phr) of a polyvinyl chloride (PVC) formulation was prepared comprising 24,948 grams (100 phr) of a PVC resin (PVC-5385, Axiall Corp., formerly Georgia Gulf, Atlanta, Ga.), 249.48 grams (1.0 phr) of a tin stabilizer (T-161, PMC Organometallix, Inc., Carrollton, Ky.), 299.38 grams (1.2 phr) of calcium stearate, 249.48 grams (1.0 phr) of a lubricant (Rheolub® RL-165, Honeywell International Inc., NJ), 24.95 grams (0.1 phr) of a secondary polyethylene lubricant (AC629A, Honeywell International Inc., NJ), 748.44 grams (3.0 phr) of calcium carbonate, and 2,494.8 grams (10 phr) of titanium dioxide. This PVC master batch was then utilized to prepare PVC formulation containing various combinations of conventional process aids (c-PA) and functionalized process aids (f-PA) with conventional impact modifiers (c-IM) or functionalized impact modifiers (f-IM). The conventional impact modifier (c-IM) utilized in this experiment was an acrylic polymer (Durastrength® D-350, Arkema Inc., King of Prussia, Pa.) and the conventional process aid (c-PA) utilized in this experiment was an acrylic polymer (Plastistrength® 550, Arkema Inc., King of Prussia, Pa.). The functionalized impact modifier (f-IM) and the functionalized process aid (f-PA) utilized in this experiment were prepared by functionalizing the conventional IM and PA with about 16 wt. % of glycidyl methacrylate (GMA).

A summary of the process aids and impact modifiers present in the four comparable samples (Run No.'s C1-C4) and two test samples (Run No.'s R1 & R2) that were prepared and tested is given below in Table 1. The amount of the impact modifier utilized in each comparable sample and test sample was 4 phr. The amount of the process aid utilized in each comparable sample and test sample was either 1 phr or 3 phr. Thus the total amount of impact modifier and process aid added to the PVC master batch was on the order of 5 phr or 7 phr.

TABLE 1

| | Composition (weights given in grams) Run No. | | | | | |
|---|---|---|---|---|---|---|
| | C1 | C2 | C3 | C4 | R1 | R2 |
| PVC Master Batch | 1725.8 | 1725.8 | 1697.8 | 1697.8 | 1725.8 | 1697.8 |
| Conventional c-IM | 59.4 | — | 59.4 | — | 59.4 | 59.4 |
| Conventional c-PA | 14.8 | 14.8 | 43.8 | 43.8 | — | — |
| Functionalized f-IM | — | 59.4 | — | 59.4 | — | — |

TABLE 1-continued

| | Composition (weights given in grams) Run No. | | | | | |
|---|---|---|---|---|---|---|
| | C1 | C2 | C3 | C4 | R1 | R2 |
| Functionalized f-PA | — | — | — | — | 14.8 | 43.8 |
| Total PA & IM phr | 5 | 5 | 7 | 7 | 5 | 7 |

The PVC formulations containing the impact modifiers and process aids were then evaluated using a Brabender rheometer and the injection molded bars or plaque formed therefrom were tested for density, Izod impact, and surface gloss at various angles. A summary of the test results is provided in Table 2 below. The test samples (Run No's R1 & R2) were observed to exhibit similar properties with respect to density, fusion time, fusion torque, fusion temperature, and equilibrium torque.

TABLE 2

| Run No. | PA phr | 20° Gloss | 60° Gloss | 85° Gloss | Izod Impact | Bulk Density (g/cc) | Fusion Time (min) | Fusion Torque (m-g) | Fusion Temp (° C.) | Equilibrium Torque (m-g) |
|---|---|---|---|---|---|---|---|---|---|---|
| C1 | 5 | 78.9 | 90.8 | 99.1 | 3.59 | 63.4 | 0.52 | 3715 | 176 | 2271 |
| C2 | 5 | 71.2 | 89.4 | 98.0 | 1.13 | 64.3 | 0.56 | 3460 | 178 | 2388 |
| C3 | 7 | 79.3 | 91.1 | 99.1 | 3.36 | 63.3 | 0.44 | 3895 | 175 | 2370 |
| C4 | 7 | 72.3 | 90.3 | 99.2 | 1.11 | 64.1 | 0.56 | 3828 | 178 | 2380 |
| R1 | 5 | 32.8 | 72.9 | 90.9 | 3.84 | 63.6 | 0.50 | 3790 | 177 | 2309 |
| R2 | 7 | 2.6 | 21.8 | 66.6 | 3.89 | 64.3 | 0.44 | 4296 | 177 | 2722 |

The comparable samples comprising a functionalized impact modifier (C2 & C4) were observed to exhibit similar gloss levels at all angles as the comparable samples comprising a conventional impact modifier (C1 & C3). However, a shift in gloss at all angles was observed for the test samples (R1 & R2) as compared to the comparable samples (C1-C4). More specifically, the test sample (R1) comprising 1 phr of the functionalized process aid exhibited a reduction in gloss as compared to the comparable samples (C1 & C2) that ranged from about 38-46 points at an angle of 20°, about 16-18 points at an angle of 60°, and about 7-9 points at an angle of 85°. Similarly, the test sample (R2) comprising 3 phr of the functionalized process aid exhibited a reduction in gloss as compared to the comparable samples (C3 & C4) that ranged from about 50-56 points at an angle of 20°, about 68-70 points at an angle of 60°, and about 33 points at an angle of 85°. In addition, the test samples (R1 & R2) exhibited as good if not better Izod impact resistance than the comparable samples (C1-C4).

This example demonstrates a PVC formulation that incorporates a functionalized process aid can be formed into a PVC component that exhibits a reduction in gloss at angles of 20°, 60°, and 85° as compared to a similar PVC component that includes only a conventional, non-functionalized process aid. This example also demonstrates that similar functionalization of an impact modifier does not provide the beneficial effect of gloss reduction as is observed for the use of the functionalized process aids. In addition, the use of a functionalized impact modifier decreases the impact properties of the PVC or other thermoplastic resin component (see C1/C3 vs C2/C4). On the other hand, the use of the functionalized process aids maintains the mechanical properties of the PVC formulation throughout processing and after forming a PVC component at a similar level as that observed for the PVC formulations and components formed using conventional process aids.

Example 5—Preparation of Process Aids Functionalized with Acrylic Acid (AA) or Glycidyl Methacrylate (GMA)

f-PA with GMA Functionalization—

A 5 liter polymerization heating mantle reactor equipped with a stirrer and a reflux condenser was charged with 848.7 g of distilled water, 31.34 g of sodium dodecylbenzene sulfonate, and 0.48 g of sodium carbonate. A monomer mixture of 320.0 grams of methyl methacrylate (MMA), 100.0 grams of butyl acrylate (BA), and 80.0 grams of glycidyl methacrylate (GMA) having a MMA/BA/GMA weight percent ratio of 64/20/16 was prepared and then added to the reactor. The reaction temperature was set to 45° C. while the reactor was sparged with nitrogen for 20 minutes. The reaction was initiated with the addition of 20.45 g 4% potassium persulfate solution in distilled water and 12.12 g 5% sodium metabisulfite solution in distilled water under the nitrogen atmosphere. A peak temperature of 86° C. was observed after 12 minutes. The reactor temperature was set to 80° C. and 1.25 g 4% potassium persulfate solution in distilled water were added to the reactor. The batch was held for 30 minutes at 80° C. and then cooled to the room temperature. The average latex particle size Dv was measured to be about 100 nm using a Nicomp Modle 380 ZLS. The solid content was ~36%. The latex particles of the f-PA functionalized with GMA were isolated using a spray dry process.

f-PA with AA Functionalization—

The same procedure as described above for the GMA functionalization of the process aid was followed to make a process aid functionalizaed with acrylic acid (AA) with the exception of substituting the GMA co-monomer with acrylic acid. Thus the monomer mixture utilized comprised 324.6 grams of methyl methacrylate (MMA), 100.0 grams of butyl acrylate (BA), 75.0 grams of acrylic acid (AA), and 0.375 grams tert-dodecyl mercaptan (t-DDM) having a MMA/BA/AA/t-DDM weight percent ratio of 64.925/20/15/0.075. A peak temperature of 79.5° C. was observed 18 minutes after the addition of the initiators. The average latex particle size was measured to be about 165 nm. The solid content was ~35.7%. The latex particles of the f-PA functionalized with AA were isolated using a spray dry process.

Example 6—PVC Formulations and Components Prepared and Tested Using the Process Aids Prepared in Experiment 2

Two master batches comprising 3,090 grams (123.6 phr) of a polyvinyl chloride (PVC) formulation was prepared and colorized with either a white pigment or beige pigment. Each batch comprised 2,500.0 grams (100 phr) of a PVC resin (SE-950, Shintech Inc., Houston, Tex.), 25.0 grams (1.0 phr) of a tin stabilizer (Thermolite® 161, PMC Group Inc., Mount Laurel, N.J.), 25.0 grams (1.2 phr) of calcium stearate, 2.5 grams (0.1 phr) of a lubricant (Epoline E-14, Westlake Chemical Corp., Houston, Tex.), 112.5 grams (4.5 phr) of an impact modifier (Durastrength® D-350, Arkema Inc., King of Prussia, Pa.), 125.0 grams (5.0 phr) of calcium carbonate, 250.0 grams (10.0 phr) of titanium dioxide, and 25.0 grams (1.0 phr) of the white or beige pigment. These PVC master batches were then utilized to prepare various PVC formulations (Run No.'s R3-R7) containing various combinations of the functionalized process aids prepared in Experiment 2, as well as a control sample (Control No. C5) comprising a conventional un-functionalized process aid.

A summary of the process aid composition added to the master batches to form the PVC formulations is provided in Table 3. Each test sample (Run No.'s R3-R7) and the control sample (Control No. C5) incorporated a total of 25.0 grams (1.0 phr) of a process aid. The process aid in the control sample (C5) was a conventional acrylic polymer (Plastistrength® 550, Arkema Inc., King of Prussia, Pa.). The f-PA used in Run No. R3 was comprised entirely of the process aid functionalized with acrylic acid (AA) in Experiment 2. Similarly, the f-PA used in Run No. R7 was comprised entirely of the process aid functionalized with glycidyl methacrylate (GMA) in Experiment 2. The f-PA used in Run No.'s R4-R6 was comprised of a mixture of the process aids functionalized with AA and GMA in Experiment 2. The ratio of AA/GMA process aids utilized in Run No.'s 4, 5, and 6 were 1/3, 2/2, and 3/1, respectively. Each test sample (Run No.'s R3-R7) and the control sample (Control No. C5) included two trials, one trial with the white pigment and one trial with the beige pigment.

TABLE 3

| | Composition (weights given in grams) Run No. | | | | | |
|---|---|---|---|---|---|---|
| | C5 | R3 | R4 | R5 | R6 | R7 |
| PVC Resin Master Batch with conventional IM | 3090 | 3090 | 3090 | 3090 | 3090 | 3090 |
| Conventional PA | 25.00 | 0.00 | 0.00 | 0.00 | 0.00 | 0.00 |
| AA functionalized PA | 0.00 | 25.00 | 6.25 | 12.50 | 18.25 | 0.00 |
| GMA functionalized PA | 0.00 | 0.00 | 18.25 | 12.50 | 6.25 | 25.00 |
| PA phr | 1 | 1 | 1 | 1 | 1 | 1 |

The PVC formulations containing functionalized process aids (Run No.'s R3-R7) and the conventional process aid (Control No. C5) were then formed into sheets (0.040"× 4.5") using a Brabender Conical Twin screw extruder and surface gloss of the sheets were measured at various angles. No differences were observed in the processing of the sheets. A summary of the average gloss measurements obtained for each test sample is provided in Table 4 below. The average gloss reported represents the average of 60 measurements taken from the top, bottom, left side, and right side of the sheets.

All of the test sheets (Run No.'s R3-R7) that contain a functionalized process aid either white or beige exhibited a substantial reduction in the gloss at all angles as compared to the gloss measured for the comparable sheet (Control No. C5) that contains conventional non-functionalized process aids. The white pigmented test sheets (R3-R7) exhibited a reduction in gloss compared to the comparable sheet (Control No. C5) on the order of about 34-39 points at an angle of 20°, about 34-55 points at an angle of 60°, about 13-20 points at an angle of 75°, and about 20-27 points at an angle of 85°. Similarly, the beige pigmented test sheets (Run No.'s R3-R7) exhibited a reduction in gloss compared to the comparable sheet (Control No. C5) on the order of about 23-30 points at an angle of 20°, about 27-46 points at an angle of 60°, about 12-19 points at an angle of 75°, and about 11-20 points at an angle of 85°.

TABLE 4

| Color | Run No. | 20° Gloss | 60° Gloss | 75° Gloss | 85° Gloss |
|---|---|---|---|---|---|
| WHITE | R3 | 9.50 | 48.37 | 80.67 | 70.23 |
|  | R4 | 4.2 | 33.57 | 74.83 | 76.37 |
|  | R5 | 5.43 | 38.73 | 77.87 | 74.47 |
|  | R6 | 7.73 | 46.10 | 82.83 | 75.87 |
|  | R7 | 3.37 | 27.87 | 74.90 | 77.33 |
|  | C5 | 43.57 | 82.83 | 95.37 | 97.37 |
| BEIGE | R3 | 10.57 | 50.23 | 82.50 | 76.17 |
|  | R4 | 3.27 | 31.10 | 75.57 | 80.37 |
|  | R5 | 5.23 | 39.80 | 79.57 | 78.97 |
|  | R6 | 8.00 | 47.40 | 80.20 | 75.20 |
|  | R7 | 3.43 | 31.90 | 77.53 | 84.33 |
|  | C5 | 33.77 | 77.53 | 94.43 | 95.77 |

In addition, the amount of f-PA functionalized with GMA or f-PA functionalized with AA is observed to affect the level of gloss reduction. In general, the gloss reduction measured for the test sheets or components was observed to increase when the ratio of GMA/AA was increased. For example, the test sheet (Run No. R7) comprising entirely the f-PA functionalized with GMA exhibited a greater reduction in gloss than the test sheet (Run No. R3) comprising entirely the f-PA functionalized with AA measured at angles of 20°-75° for both white and beige colored components.

Figure 2:
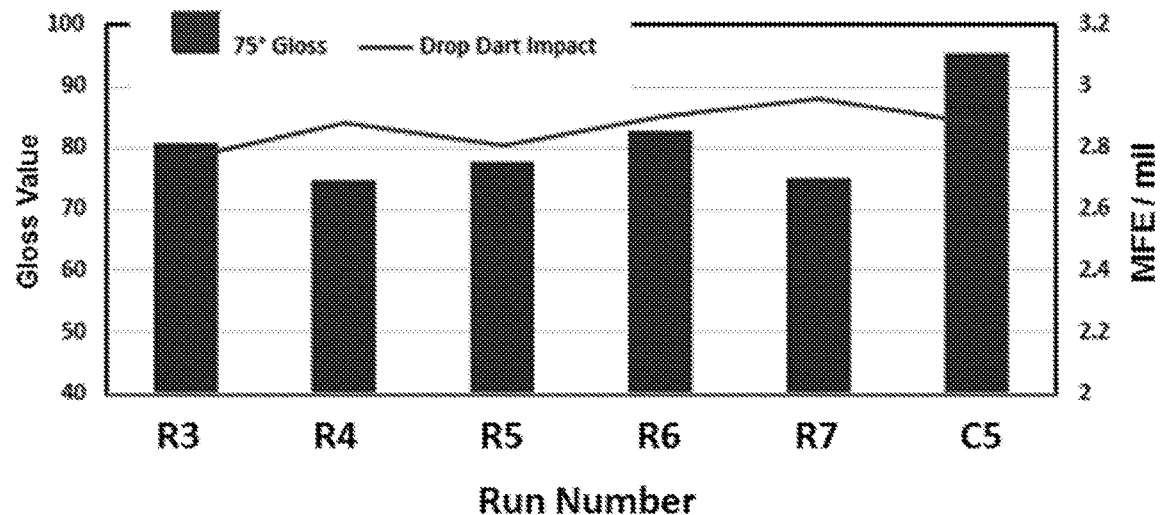
FIG. 2 is a graphical comparison of the surface gloss (75°) and impact strength measured for PVC components prepared from various PVC formulations of the present disclosure and from a conventional PVC formulation.
Figure 3:
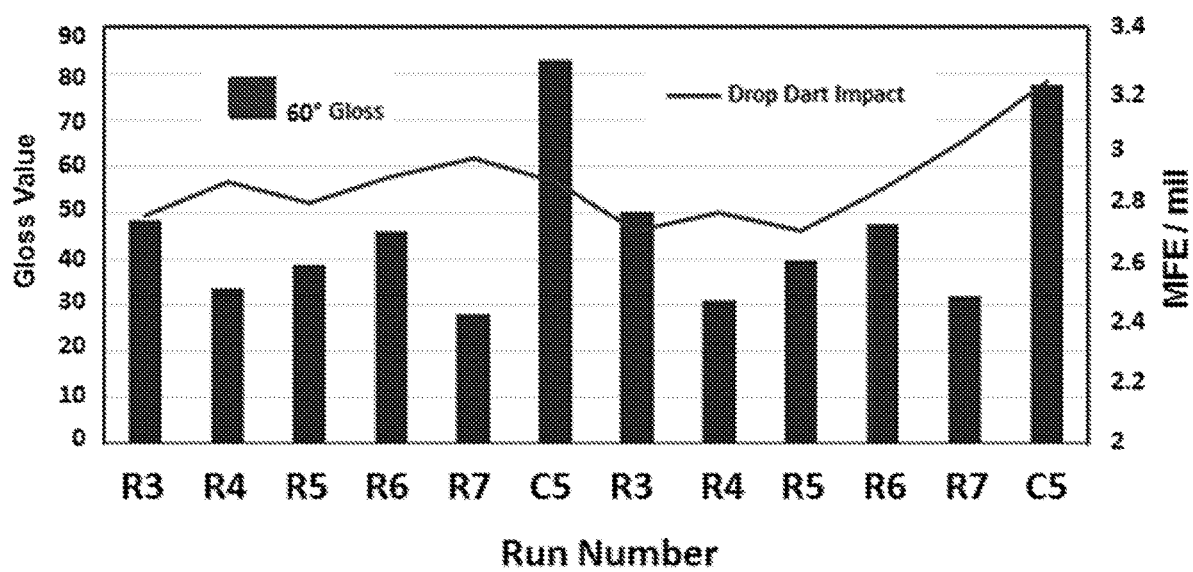
FIG. 3 is another graphical comparison of the surface gloss (60°) and impact strength measured for PVC components prepared from various PVC formulations of the present disclosure and from a conventional PVC formulation.

Referring now to FIGS. 2 and 3, the gloss values measured at an angle of 60° and 75°, respectively, for test sheets or components (Run No.'s R3-R7) is graphically compared to the gloss value measured for the comparable sheet (Control No. C5). In addition, the impact results of the dart drop test for each sheet is also compared. The incorporation of the f-PA into the PVC or other thermoplastic resin component is found to reduce the gloss and have no effect on the impact strength of the component as compared to the impact performance exhibited by a PVC component having only conventional non-functionalized process aids.

This example also demonstrates a PVC formulation that incorporates a functionalized process aid can be formed into a PVC component that exhibits a reduction in gloss at angles of 20°, 60°, and 85° as compared to a similar PVC component that includes only a conventional, non-functionalized process aid. This example further demonstrates that the functionalization of the process aid may be done using GMA, AA, or a mixture thereof. A comparison between the gloss reduction exhibited by test components that include f-PA functionalized with GMA and test components that include f-PA functionalized with AA indicates that GMA functionalization may be more effective at reducing the gloss of the component than AA functionalization. This example also demonstrates that the gloss reduction resulting from the incorporation of a functionalized process aid can be observed with different colored PVC components.

Example 7—Additional PVC Formulations and Components Prepared and Tested Using the Process Aids Prepared in Experiment 2

A master batch of a 2,526.0 grams (126.3 phr) of a polyvinyl chloride (PVC) formulation was prepared comprising 2,000 grams (100 phr) of a PVC resin (SE-950, Shintech Inc., Houston, Tex.), 20.0 grams (1.0 phr) of a tin stabilizer (Thermolite® 161, PMC Group Inc., Mount Laurel, N.J.), 24.0 grams (1.2 phr) of calcium stearate, 20.0 grams (0.1 phr) of a lubricant (Rheolub® RL-165 Honeywell International Inc., NJ), 2.0 grams (0.1 phr) of a secondary polyethylene lubricant (AC629A, Honeywell International Inc., NJ), 90.0 grams (4.5 phr) of an impact modifier (Durastrength® D-350, Arkema Inc., King of Prussia, Pa.), 100.0 grams (5.0 phr) of calcium carbonate, 200.0 grams (10.0 phr) of titanium dioxide, and 70.0 grams (3.5 phr) of a beige pigment. This PVC master batch was then utilized to prepare various PVC formulations (Run No.'s R8-R12) containing various combinations of the functionalized process aids prepared in Experiment 2, as well as control formulations (Control No.'s C6-C14) comprising un-functionalized process aids and/or impact modifiers.

A summary of the process aid composition added to the master batches to form the PVC formulations is provided in Table 5. Each test sample (Run No.'s R8-R11) and control formulations (Control No.'s C6-C14) incorporated a total of 20.1 grams (1.0 phr) of a process aid. The process aid in the control No's C6-C9 and C11-C13 was a conventional acrylic polymer (Plastistrength® 550, Arkema Inc., King of Prussia, Pa.). In Control No.'s C7-C10 an impact modifier (Paraloid™ EXL-5136, Dow Chemical Co., Midland, Mich.) was utilized. This impact modifier is a polymer core/shell impact modifier having a core of poly(butyl acrylate) and a shell of poly(methyl acrylate). In Control No.'s C11-C14, another impact modifier (Altuglas® BS-130, Arkema Inc., King of Prussia, Pa.) was utilized. This impact modifier is a cross-linked poly(methyl methacrylate) particle having an average size of several microns. The f-PA used in Run No. R8 was comprised entirely of the process aid functionalized with acrylic acid (AA) in Experiment 2. Similarly, the f-PA used in Run No. R9 was comprised entirely of the process aid functionalized with glycidyl methacrylate (GMA) in Experiment 2. The f-PA used in Run No. R10 was comprised of a 50:50 mixture of the process aids functionalized with AA and GMA in Experiment 2. Finally, the f-PA used in Run No. R11 was comprised of a 50:50 mixture of the process aid functionalized with AA in Experiment 2 and a conventional acrylic polymer (Plastistrength® 550, Arkema Inc., King of Prussia, Pa.).

TABLE 5

| Run No. | Impact Modifer grams (phr) | Process Aid grams (phr) |
|---|---|---|
| C6 | — | 20.06 (1) |
| C7 | 10.03 (0.5) | 20.06 (1) |
| C8 | 20.06 (1) | 20.06 (1) |
| C9 | 40.12 (2) | 20.06 (1) |
| C10 | 20.06 (1) | — |
| C11 | 10.03 (0.5) | 20.06 (1) |
| C12 | 20.06 (1) | 20.06 (1) |
| C13 | 40.12 (2) | 20.06 (1) |
| C14 | 20.06 (1) | — |
| R8 | — | 20.06 (1) |
| R9 | — | 20.06 (1) |
| R10 | — | 20.06 (1) |
| R11 | — | 20.06 (1) |

The PVC formulations containing the impact modifiers and/or process aids were then evaluated using a Brabender rheometer and the injection molded bars or plaque formed therefrom were tested for density, Gardner impact, and surface gloss at various angles. A summary of the bulk density, fusion time, fusion torque, fusion temperature, and equilibrium torque is provided in Table 6. The test samples (Run No's R8-R11) and the comparative samples (Control No.'s C6-C14) were observed to exhibit similar properties with respect to density, fusion time, fusion torque, and fusion temperature. However, the test samples (Run No.'s R8-R11) were found to exhibit a substantial enhancement in equilibrium torque over the comparative samples (Control No.'s C6-C14). Thus, PVC formulations containing functionalized process aids (Run No.'s R8-R10) or a mixture of functionalized process aid and a non-functionalized process aid (Run No. R11) exhibit better mechanical properties than PVC formulations containing a non-functionalized process aid (Control No. C6) or mixtures of conventional, non-functionalized process aids and impact modifiers (Control No.'s C7-C9 & C11-C13), or only impact modifiers (Control No.'s C10 & C14).

TABLE 6

| Run No. | Bulk Density (g/100 cc) | Fusion Time (min:sec) | Fusion Torque (m-g) | Fusion Temp (° C.) | Equilibrium Torque (m-g) |
|---|---|---|---|---|---|
| C6  | 65.23 | 0:16 | 3399 | 173 | 1585 |
| C7  | 66.30 | 0:16 | 3341 | 176 | 1540 |
| C8  | 67.00 | 0:12 | 3705 | 169 | 1607 |
| C9  | 67.21 | 0:14 | 3774 | 168 | 1644 |
| C10 | 67.24 | 0:12 | 3617 | 166 | 1532 |
| C11 | 65.29 | 0:14 | 3412 | 171 | 1549 |
| C12 | 65.24 | 0:16 | 3403 | 173 | 1563 |
| C13 | 65.57 | 0:16 | 3509 | 177 | 1592 |
| C14 | 65.43 | 0:16 | 3330 | 174 | 1530 |
| R8  | 65.09 | 0:14 | 3645 | 173 | 1767 |
| R9  | 65.26 | 0:16 | 3414 | 174 | 1735 |
| R10 | 65.25 | 0:18 | 3337 | 178 | 1716 |
| R11 | 65.07 | 0:14 | 3423 | 173 | 1700 |

The PVC formulations containing functionalized process aids (Run No.'s R8-R11) and the conventional process aids and/or impact modifiers (Control No.'s C5-C14) were then formed into sheets (0.040"×6') using a Brabender Conical Twin screw extruder and surface gloss of the sheets were measured at an angle of 60°. A summary of the average gloss measurements obtained for each test sample is provided in Table 7 below. The average gloss reported represents the average of 20 measurements taken from the top and bottom of the sheets.

All of the test sheets (Run No.'s R8-R11) that contain a functionalized process aid exhibited either a reduction in the gloss or an enhanced impact property as compared to the gloss measured for the comparable sheets (Control No.'s C6-C14) that contain a non-functionalized process aid, a conventional impact modifier, or a mixture thereof. The test sheets (Run No.'s R3-R7) exhibited improved Gardner impact over the Control sheets containing only a conventional impact modifier (Control No.'s C10 & C14) or a mixture of the impact modifier with a conventional process aid (Control No.'s C7-C9 & C11-C13). In addition, the test sheets (Run No.'s R3-R7) exhibited a reduction in gloss measured at the top of the sheet compared to comparable sheets (Control No.'s C6-C14) on the order of about 10 points or more at an angle of 60°. Similarly, the test sheets (Run No.'s R3-R7) exhibited the same or a lower level of gloss measured at the bottom of the sheet as compared to comparable sheets (Control No.'s C6-C14) at an angle of 60°.

TABLE 7

| Run No. | IM + PA (phr + phr) | Gardner Impact MFE | Average (60° angle) Top of Sheet | Bottom of Sheet |
|---|---|---|---|---|
| C6  | 0 + 1   | 125.8 | 56.6 | 77.4 |
| C7  | 0.5 + 1 | 100.8 | 42.0 | 71.6 |
| C8  | 1 + 1   | 101.6 | 55.7 | 68.0 |
| C9  | 2 + 1   | 102.4 | 45.6 | 58.3 |
| C10 | 1 + 0   | 101.8 | 43.7 | 65.3 |
| C11 | 0.5 + 1 | 103.2 | 51.1 | 72.5 |
| C12 | 1 + 1   | 105.6 | 48.0 | 62.8 |
| C13 | 2 + 1   | 99.2  | 39.3 | 49.6 |
| C14 | 1 + 0   | 101.6 | 39.0 | 60.9 |
| R8  | 0 + 1   | 116.8 | 18.6 | 29.6 |
| R9  | 0 + 1   | 109.8 | 36.3 | 66.2 |
| R10 | 0 + 1   | 116.8 | 28.5 | 54.2 |
| R11 | 0 + 1   | 108.8 | 34.1 | 59.7 |

This example demonstrates a PVC formulation that incorporates a functionalized process aid can be formed into a PVC component that exhibits a reduction in gloss at an angle of 60° or enhanced impact properties as compared to a similar PVC component that includes only a conventional, non-functionalized process aid, a mixture of a conventional process aid and an impact modifier, or an impact modifier only. This example further demonstrates that the functionalization of the process aid may be done using GMA, AA, or a mixture thereof. Finally, this example demonstrates the enhanced performance of PVC components comprising a functionalized process aid as compared to the current matting agent technologies (Control No.'s C7-C14) currently utilized commercially in the industry of PVC windows, doors, and siding capstock.

Within this specification embodiments have been described in a way which enables a clear and concise specification to be written, but it in intended and will be appreciated that embodiments may be variously combined or separated without parting from the invention. For example, it will be appreciated that all preferred features described herein are applicable to all aspects of the invention described herein.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

Example 8 (Prophetic Example)—PVC—Acrylic Formulation to be Prepared and Tested Using the Process Aids Prepared in Experiment 2

A master batch of 1,262 grams (63.1 phr) of a polyvinyl chloride (PVC) formulation will be prepared comprising 1,000 grams (50 phr) of PVC resin (SE-950, Shintech Inc., Houston, Tex.), 24 grams (1.2 phr) of a tin stabilizer (Thermolite® 172, PMC Group Inc., Mount Laurel, N.J.), 24 grams (1.2 phr) of a lubricant (Rheolub® RL-165 Honeywell International Inc., NJ), 12 grams (0.6 phr) of calcium stearate, 2 grams (0.1 phr) of a secondary polyethylene lubricant (AC629A, Honeywell International Inc., NJ), and 200 grams (10 phr) of titanium dioxide.

Along with the PVC master batch, 1,000 grams (50 phr) of acrylic resin (Solarkote® PB, Arkema Inc., King of Prussia, Pa.) and 100 grams (5 phr) of process aid from those prepared in Example 2 will be added and blended together to form a PVC-acrylic formulation.

Example 9 (Prophetic Example)—Acrylic Formulation to be Prepared and Tested Using the Process Aids Prepared in Experiment 2

In order to prepare an acrylic formulation, 2,000 grams (100 phr) of acrylic resin (Solarkote® P600, Arkema Inc., King of Prussia, Pa.) will be supplemented with 100 grams (5 phr) of process aid from those prepared in Example 2.

What is claimed is:

1. A polyvinyl chloride (PVC) component with reduced surface gloss comprising:
a PVC resin and one or more crosslinked functionalized non-core-shell process aids that comprise at least one base polymer which is functionalized with about 1 wt. % to about 25 wt. % of a reactive epoxy or hydroxyl functional group based on the total weight of the process aids; and optionally, at least one core shell impact modifier; wherein the PVC exhibits a gloss reduction of at least 5 points measured at an angle of 85 degrees or less when compared to a similar PVC component in which the process aids are not functionalized, wherein the one or more crosslinked functionalized non-core-shell process aids have a molecular weight (Mw) that is 50,000 g/mol or higher in a filtered or unfiltered state and wherein a fraction of the crosslinked functionalized non-core-shell process aid is insoluble in organic solvents, the insoluble fraction ranging from 1% to about 90% using extraction with acetone as a solvent, wherein the PVC resin and the crosslinked functionalized non-core-shell process aids do not include added cross-linking agents other than the functional group on the processing aid.

2. The PVC component according to claim 1, wherein the process aids are present in about 0.1 to about 12 phr of PVC resin.

3. The PVC component according to claim 1, wherein the one or more process aids is functionalized with at least 5 wt. % of the reactive functional group based on the total weight of the process aids.

4. The PVC component according to claim 1, wherein the PVC component exhibits a gloss reduction of at least 10 points when measured at an angle of 60 degrees or less, when compared to a similar PVC component in which the process aids are not functionalized.

5. The PVC component according to claim 1, wherein the PVC component containing the functionalized process aids and the similar PVC component containing the non-functionalized process aids exhibit a comparable impact property; the impact property being measured as Izod impact or drop dart impact.

6. The PVC component according to claim 1, wherein the reactive epoxy or hydroxyl functional group is derived from one or more of hydroxyl-substituted alkyl esters of (meth) acrylic acid; or epoxy group-containing monomers.

7. The PVC component according to claim 1, wherein the base polymer of the one or more process aids comprises an acrylic polymer or copolymer.

8. The PVC component according to claim 7, wherein the acrylic copolymer is derived from vinyl- or (meth)acrylic-containing monomers and derivatives thereof; styrene or styrene derivatives; olefins; dienes; or mixtures thereof.

9. The PVC component according to claim 1, wherein the one or more process aids have a molecular weight ($M_w$) that is about 100,000 g/mol or higher.

10. An automotive product, a building material, a household or kitchen item, a medical or office supply product, apparel, or packaging for personal care product comprising the PVC resin component of claim 1.

11. The polyvinyl chloride (PVC) component with reduced surface gloss of claim 1 wherein the one or more crosslinked functionalized non-core-shell process aids has a molecular weight (Mw) of at least 2,690,000 g/mol up to about 15,000,000 g/mol.

12. The polyvinyl chloride (PVC) component with reduced surface gloss of claim 1 wherein the insoluble fraction of the crosslinked functionalized non-core-shell ranges from 4 to about 90%.

13. The polyvinyl chloride (PVC) component with reduced surface gloss of claim 1 wherein the insoluble fraction of the crosslinked functionalized non-core-shell ranges from 10 to about 90%.

14. The polyvinyl chloride (PVC) component with reduced surface gloss of claim 1 wherein the insoluble fraction of the crosslinked functionalized non-core-shell ranges from 20 to about 90%.

15. The polyvinyl chloride (PVC) component with reduced surface gloss of claim 1 wherein the one or more crosslinked functionalized non-core-shell process aids has a molecular weight (Mw) of at least 2,690,000 g/mol up to about 15,000,000 g/mol and wherein the insoluble fraction of the crosslinked functionalized non-core-shell ranges from 10 to about 90%.

16. A method of reducing surface gloss of a polyvinyl chloride (PVC) component, the method comprising:
providing a PVC resin; forming at least one base polymer as a non-core-shell process aid;
functionalizing the at least one base polymer to form a crosslinked functionalized non-core-shell process aid; the base polymer being functionalized with about 1 wt. % to about 25 wt. % of a reactive epoxy or hydroxyl functional group based on the total weight of the process aid; and optionally, providing at least one core shell impact modifier; producing a PVC formulation from the PVC resin, the crosslinked functionalized non-core-shell process aid, and the optional core shell impact modifier; and forming the PVC resin component from the PVC formulation;
wherein the PVC resin component exhibits a gloss reduction of at least 5 points measured at an angle of 85 degrees or less when compared to a similar PVC component in which the process aids are not functionalized, wherein the one or more crosslinked functionalized non-core-shell process aids have a molecular weight (Mw) that is 50,000 g/mol or higher in a filtered or unfiltered state and wherein a fraction of the crosslinked functionalized non-core-shell process aid is insoluble in organic solvents, the insoluble fraction ranging from 1% to about 90% using extraction with acetone as a solvent, and wherein the PVC resin and the crosslinked functionalized non-core-shell process aids do not include added cross-linking agents other than the functional group on the processing aid.

17. The method according to claim 16, wherein the process aids are present in about 0.1 to about 12 phr of PVC resin.

18. The method according to claim 16, wherein the one or more process aids is functionalized with at least 5 wt. % of the reactive functional group based on the total weight of the process aids.

19. The method according to claim 16, wherein the PVC resin component exhibits a gloss reduction of at least 10 points when measured at an angle of 60 degrees or less.

20. The method according to claim 16, wherein the PVC resin component containing the functionalized process aids and the similar PVC component containing the non-functionalized process aids exhibit a comparable impact property; the impact property being measured as Izod impact or drop dart impact.

21. The method according to claim 16, wherein the reactive epoxy or hydroxyl functional group is derived from one or more of hydroxyl-substituted alkyl esters of (meth) acrylic acid; or epoxy group-containing monomers.

22. The method according to claim 16, wherein the base polymer of the one or more process aids comprises an acrylic polymer or copolymer.

23. The method according to claim 22, wherein the acrylic copolymer is derived from vinyl- or (meth)acrylic-containing monomers or derivatives thereof; styrene or styrene derivatives; olefins; dienes; or mixtures thereof.

24. The method according to claim 16, wherein the one or more functionalized process aids have a molecular weight ($M_w$) that is about 100,000 g/mol or higher.

* * * * *